United States Patent Office 3,476,270
Patented Nov. 4, 1969

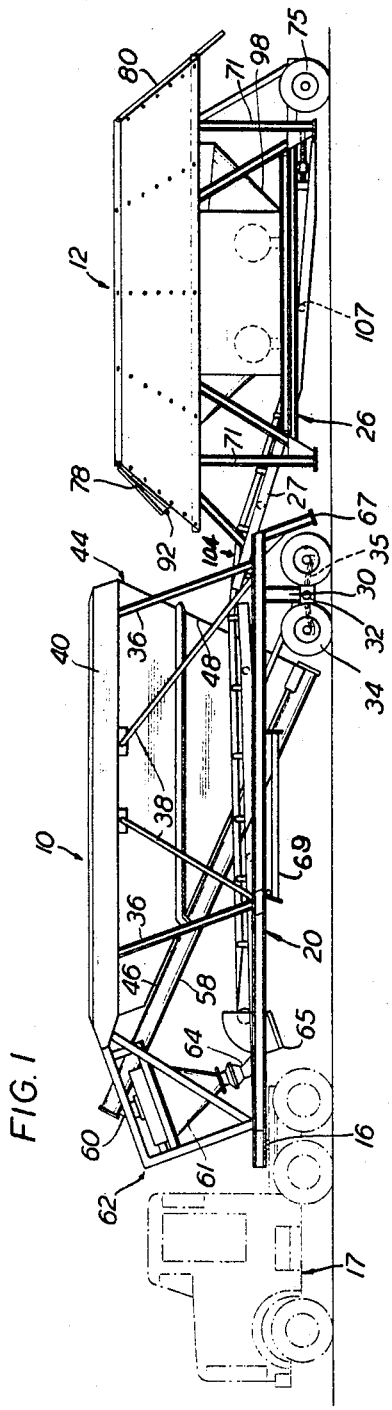

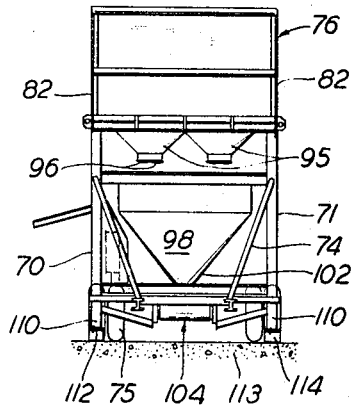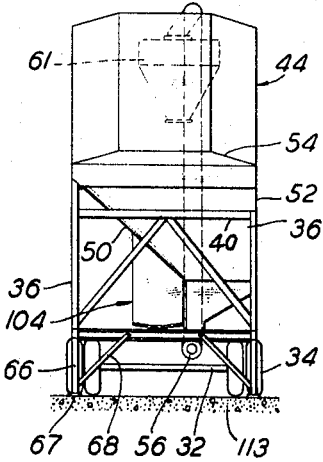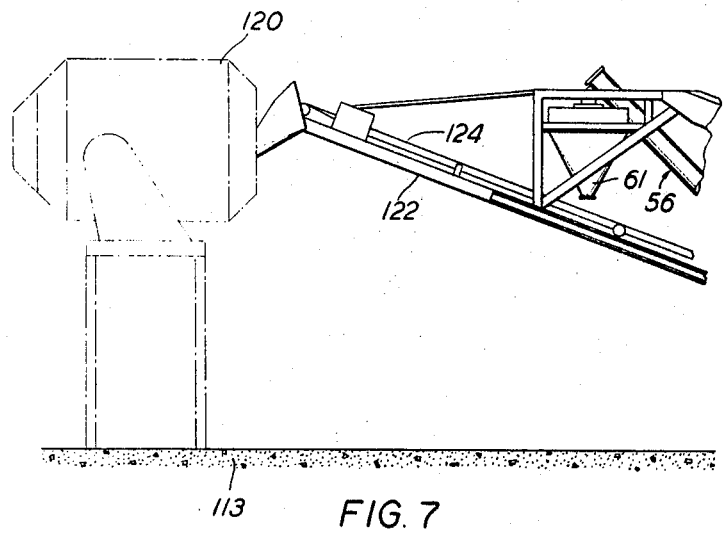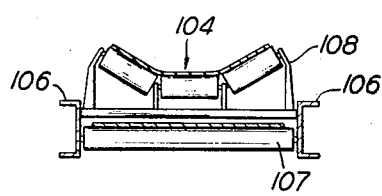

3,476,270
MOBILE CONCRETE BATCHING PLANT
George W. Cox, Lloyd J. Garcia, and Edward Reyes, San Antonio, Tex., assignors to Aggregate Plant Products Company, San Antonio, Tex., a corporation of Texas
Continuation of application Ser. No. 697,831, Jan. 15, 1968. This application Oct. 9, 1968, Ser. No. 770,135
Int. Cl. G01g 19/22; B65g 65/30
U.S. Cl. 214—2                                  9 Claims

ABSTRACT OF THE DISCLOSURE

A plural component plant such as a mobile concrete batching plant formed of two semi-trailers connected together in trailing relation and transportable from site to site by connection to a tractor. Components such as a cement silo, a screw conveyor, a weighing apparatus and a common cement and aggregate discharge are mounted on the first semi-trailer. The second semi-trailer has other components such as an aggregate weighing bin or batcher and aggregate discharge mounted in the lower portion, and an aggregate bin having hinged end and side walls mounted in the top portion.

The first semi-trailer is provided with mounting members so that when erected to an inclined position the weight is no longer on the wheels. The second semi-trailer also has mounting members and erecting movement of the first semi-trailer moves the second semi-trailer to a position where the weight is no longer on the wheels. An endless belt conveyor extends from the aggregate discharge to the common cement and aggregate discharge and is releasable to permit the desired relative movement of the trailers in erection and transportation, and the trailers may be towed separately or in tandem as desired.

BACKGROUND OF THE INVENTION

This application is a continuation of prior application Ser. No. 697,831, filed Jan. 15, 1968, now abandoned for Mobile Batching Plant.

This invention relates to a concrete batching plant and, more particularly, to a mobile batching plant transportable from site to site by connection to a tractor.

Concrete is prepared by mixing water with cement and aggregate, usually sand and gravel, in predetermined proportions. In order to meet specifications, it is necessary that such proportions be rather rigidly maintained. Accordingly, it has become customary to employ a batching plant which weighs the dry ingredients prior to dispensing them into the mixer which is often a truck-mounted mixer commonly known as "ready-mix truck." The concrete is then mixed enroute to the job site. Since the proportions of the various ingredients can be rigidly controlled at the batching plant, this system provides an excellent quality of concrete. However, there is a hauling distance beyond which it becomes uneconomical. To decrease the hauling distance, a batching plant of temporary construction may be erected at a convenient location. After the convenience of the location has been exceeded, the batching plant is disassembled and transported to a new location where it is again erected. The assembly, disassembly and transportation of such a plant is time consuming and expensive; therefore, an effort has been made to provide portable batching plants for use on construction, building and highway projects. The portable batching plants are usually easily erectable and transportable from site to site; however, in order to allow for highway travel, the size of such portable batching plants has been limited. Oftentimes a portable batching plant cannot satisfactorily maintain a consistent flow of ingredients. Accordingly, it is an object of the present invention to provide a mobile batching plant which may be easily erected and transported from site to site by connection to the fifth wheel of a tractor, and which is of such construction that the batching plant may be made the necessary size to provide the desired flow of material therethrough, while at the same time allowing for highway travel. In the erect stage, the weight of the various ingredients add considerable weight to the plant and it is desirable that at such time the weight of the batching plant be supported on elements other than the road wheels. Accordingly, it is another object to provide a mobile batching plant which, when it is erected, is supported on members other than its road wheels.

Summary of the invention

The plant of this invention as specifically disclosed is formed of two semi-trailers coupled together in trailing relation. The first semi-trailer has means at its front end for engagement with the fifth wheel of a tractor, and a trailer hitch at its rear end. Mounted in the first semi-trailer are a cement bin or silo, a screw or other suitable type conveyor, a weighing cement hopper and a common cement and aggregate discharge. Means are provided so that when the first semi-trailer is moved from a horizontal transport position to an inclined erect position the weight is transferred from the wheels to mounting members. The second semi-trailer has an open box-like framework and an aggregate weighing apparatus and an aggregate discharge mounted in the lower portion of the framework. An aggregate bin having hinged end and side walls is mounted in the upper portion of the framework. The walls are erected at the site and in such position forms an aggregate bin which may be partitioned to contain any number of different sizes of aggregates and is of a size to hold a sufficient quantity of aggregate to provide the desired flow. Prior to moving the batching plant to a new location, the walls are collapsed, making the height and width of the second semi-trailer such that it will meet local highway height and width requirements. Elevation of the first semi-trailer causes the second semi-trailer to be tipped slightly forward. By placing supports such as mounting blocks under mounting members carried by the trailers for this purpose weight of the second semi-trailer is taken off the wheels and carried by the mounting members. Extending from the aggregate discharge in the first semi-trailer to the common cement and aggregate discharge in the second semi-trailer is an endless belt conveyor which delivers the aggregate to the common discharge. The endless belt conveyor remains in position during transport by tandem towing.

Brief description of the drawings

In the drawings:

FIG. 1 is a side view of the mobile batching plant in transport position and attached to a tractor for moving it to a new site;

FIG. 2 is a side view of the mobile concrete batching plant erected at the site ready for operation;

FIG. 3 is a rear end view of the aggregate trailer is erected position;

FIG. 4 is a rear end view of the cement trailer in erected position;

FIG. 5 is a section view taken along lines 5—5 of FIG. 2 to illustrate the connection between the end and side walls of the aggregate bin;

FIG. 6 is a section view taken generally along lines 6—6 of FIG. 2 illustrating the aggregate conveyor; and FIG. 7 is a side elevation of a modification of the cement trailer for use with a permanent or portable mixer.

Description of the preferred embodiment

Referring now to the drawings, it can be seen that the mobile batching plant is comprised of a pair of semi-trailers 10 and 12 which are connected together in trailing relation. The first semi-trailer is provided with tractor carried trailer hitch engaging means such as a king pin 14 by which the mobile batching plant may be attached to a tractor mounted trailer hitch such as a fifth wheel 16 of a tractor 17 for transport. King pin 14 is mounted on the front end of a frame 20 of first semi-trailer 10. At the rear end of frame 20 there is a trailer carried trailer hitch 22. The second semi-trailer is formed of a frame 26 having a tongue 27 which has at its forward end trailer carried trailer hitch engaging means such as a clevis 28 for engagement with trailer hitch 22 of the first trailer. The trailer hitches which connect the first semi-trailer to the tractor and the second semi-trailer to the first may be in the form of fifth wheel connections or any other trailer hitch connection which permits universal movement. Although the plant is designed to be moved as a unit with the two trailers connected together in trailing relation, if the circumstances are such as to require separate movement they may be disconnected and transported separately.

Frame 20 is of generally rectangular construction and is formed of structural steel members of sufficient strength to support a relatively heavy load. Extending downward adjacent the rear end of the frame are vertical members 30 in which is mounted an axle 32 for receiving dual pairs of tandem wheels 34 which are pivotally mounted about axle 32. Such mounting may include springs 35 which are connected to the axles containing wheels 34. Extending upward from frame 20 are columns 36 which, together with angular support members 38 and cross members 40, form an open box-like construction in which is mounted a cement bin or silo 44.

A cement bin or silo 44 is provided with front and rear bottom walls 46 and 48, side walls 50 and 52 and a top wall 54. The front bottom wall 46 is the longer wall and extends at a lesser angle than shorter rear bottom wall 48. In vertical or side elevation the cement bin or silo is triangular, see FIG. 1; but may be of any shape.

Extending along the cement bin or silo, preferably to one side of long, sloping front bottom wall 46, is a screw conveyor 56 or other suitable conveyor contained in a conveyor case 58, having communication with the interior of the current silo adjacent the juncture of the two bottom walls. The conveyor has an upper delivery end 60 which is in communication with a cement batch hopper 61 pivotally mounted in front end 62 of main frame 20. The mounting for the hopper is, in effect, a scale the indications of which may be read on dial 63 in the second trailer. The cement batch hopper has discharge 64 which is in communication with a common cement and aggregate discharge 65 attached to main frame 20.

Extending angularly downward from each side of the rear end of frame 20 rearwardly of wheels 34 and pivot 32 are support members 66—66 having attached to their lower ends mounting pads 67—67. Angular stress members 68—68 extend from members 66—66 to the rear end of frame 20. Hinged to the lower portion of each side frame 20 slightly forward of the midsection are hinged support columns 69—69. The first semi-trailer, after it has been detached from the tractor, is elevated to an inclined position, in which position the mounting pads attached to support members 66—66 will have been lowered to contact the surface, see FIG. 2. In such position, hinged support columns 69—69 will have also moved to a vertical position and will contact the surface. To stabilize the support columns, detachable inclined members 70 extend from each support column 69 to frame 20. As can be seen in FIG. 1, support columns 69 may be hinged to frame 20 for storing during transport. When the first semi-trailer is in its erected position, the weight thereof is carried by the support members 66—66 and support columns 69—69. As can be seen in FIG. 2, the tandem set of wheels have swiveled about axle 32 and no longer carry the weight of the semi-trailer.

Frame 26 of second semi-trailer 12 is of generally rectangular construction and is formed of structural steel members of sufficient strength to support a relatively heavy load. Extending through and forward of frame 26 is tongue 27 on which is mounted mating trailer hitch means 28 for connecting the second semi-trailer to the first. At the rear end of frame 26 dual sets of road wheels 75—75 are mounted. Extending upward from frame 26 are vetrical columns 71 to which are attached top horizontal members 72 forming an open box-like framework. To make the framework more rigid, inclined members 74 may extend interiorly and exteriorly of vertical columns 71. Mounted in the upper portion of the box-like framework is an aggregate bin 76.

The aggregate bin has hinged end walls 78 and 80 and hinged side walls 82—82, all of which pivot about the top horizontal members 72 of the open box-like framework, see FIGURE 1. At the site, the hinged walls are erected which enables the aggregate bin to be of a capacity sufficient to provide the desired flow of ingredients during the mixing of the concrete. To fasten the hinged walls in the erect position, the end walls may have flanges 84 provided with space apertures 86. In such case, the side walls have mating apertures 88. When the walls are erected, threaded members 90 are placed through the mated apertures to retain the walls in erected position, see FIG. 5. As can be seen, front end wall 78 is provided with a second hinge 92 intermediate of its extent to permit the front end wall to be folded and thereby clear the rear end of the first semi-trailer, see FIG. 1. The aggregate bin may be provided with partition 93 to divide the bin into a number of compartments. The aggregate bin in the erected position is of sufficient size to accommodate one or more partitions 93 which provide a desired number of compartments. To position partitions in aggregate bin 76, partitions 93 may be provided with flanges having spaced apertures. Side walls 80—80 are provided with mating apertures and threaded members 94 are attached to secure partitions 93 in position.

Also mounted in the upper portion of the open box-like framework are discharge ends 95 of aggregate bin 76, each of the discharges is provided with a sliding gate 96. Underneath the gates of the aggregate bin is an aggregate weighing bin or batcher 98 which is pivotedly suspended so that the aggregate placed therein may be weighed. The weight indication for the aggregate bin is indicated on scale 100. Aggregate weighing bin 98 is provided with an aggregate discharge 102.

Underneath aggregate discharge 102 is an endless belt conveyor 104 which extends from aggregate discharge 102 along tongue 27 and a central beam 106 in the first semi-trailer which is alongside of cement silo 44 to the common aggregate and cement discharge 65. Pulleys 107 for endless belt conveyor 104 are mounted between the structural members forming tongue 28 and central beam 106. Atop the tongue and the central beam there are mounted idler assemblies 108 which may form a trough so that aggregate dispensed from aggregate discharge 102 will remain on the belt conveyor until it arrives at common cement and aggregate discharge chute 65, see FIG. 6. The conveyor remains in position at all times. To regulate the tension of the belt, a takeup assembly 109 is attached to the bearing for the pulley at the end of the second semi-trailer. Accordingly, in getting ready for transport the belt may be loosened or partly or wholly released so that there will be no tension on the belt during transport.

Extending downward from vertical columns 71 forwardly of the wheels 75 of the second semi-trailer are mounting or support members 110, having at their bottom end mounting pads 112 having apertures.

Although the batching plant may be transported over most highways when it is empty, the weight of the cement and aggregate when it is in erect operating position is very substantial. At such time, the gross weight of the batching plant is such that, for all but the most solid substructures, foundations may be required. Therefore, at the erection site, foundations 113 will normally be provided for the support members of the two units. When the first semi-trailer is moved to its erect position the pivot point of the trailer mounted trailer hitch 22 thereon moves to a lower level, compare FIGS. 1 and 2; since the second semi-trailer is attached thereto, there is a slight downward movement of the second semi-trailer. Mounting blocks 114, which may be constructed of I-beams having plates welded to the ends, are placed under mounting pads 112 and bolted thereto. Angular movement of the first semi-trailer will lower the front end and, in effect, make the level of the second semi-trailer horizontal and the mounting pads will be in contact with the foundation, see FIG. 2. In such position, the road wheels of both semi-trailers, although they may be in contact with the surface, will not be carrying the weight.

The batching plant is adapted so that if desired either a permanent or a portable mixer 120 may be in communication with the cement trailer, see FIG. 7, where it can be seen that a boom 122 may be attached to the front end of the frame of the first trailer. In such event, the additional boom is also provided with an endless belt conveyor 124 which is in communication with the mouth of the permanent mixer.

The above construction provides a mobile batching plant which, while being capable of transporting over roads and highways will, when erected, contain a sufficient capacity of ingredients to provide a consistent flow. Moreover, when in the erect position and, therefore, of substantially increased weight the two semi-trailers forming the batching plant have mounting members in contact with solid foundations which support them in the erected position thereby taking the weight of the batching plant and materials off of the road wheels.

From the foregoing it can be seen that this invention is one well adapted to attain all the ends and objects hereinabove set forth, together with other advantages which are obvious and which are inherent to the apparatus.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A mobile plural component plant transportable from site to site by connection to a tractor, comprising a first semi-trailer having adjacent its front end a means for engagement with a tractor-carried trailer hitch, and having adjacent its rear end a pair of wheels pivotally supporting the rear portion of the semi-trailer, and a trailer hitch carried on said first semi-trailer in a position to move downwardly when the front end of the first semi-trailer is elevated; means to support said first semi-trailer with its front end elevated above tractor engaging position and in an inclined plant operating position at the plant operating site while disengaged from a tractor; a second semi-trailer having adjacent its front end a means for engagement with the trailer hitch of the first semi-trailer and adjacent its rear end a pair of wheels pivotally supporting the rear portion of the second semi-trailer; and support members on said semi-trailers in positions to move downwardly to engage a support therebelow and lift weight from said wheels when the front end of said first semi-trailer is raised; a storage container for material to be batched mounted on said second semi-trailer, a discharge chute for discharging material to be batched located on said first semi-trailer forwardly of the wheels of the first semi-trailer so that it will occupy a more elevated position when said first semi-trailer is in inclined plant operating position, a batching apparatus on one of said semi-trailers adapted to receive material from said storage container and discharge it to said chute, and conveyor means extending between said semi-trailers for conveying material along a portion of its travel from said storage container to said chute.

2. A mobile plural component plant as set forth in claim 1 in which said last-mentioned conveyor means is releasable from one of said semi-trailers to an extent sufficient to permit the lowering of the front end of said first semi-trailer from its inclined plant operating position to its lower position for engagement with a tractor carried trailer hitch.

3. A mobile plural component plant as set forth in claim 2 in which the releasing of said conveyor means is additionally sufficient to permit the normal flexing of said semi-trailers relative to one another when towed in tandem with the trailer hitch engaging means of the second semi-trailer engaged with the trailer carried trailer hitch on the first semi-trailer.

4. A mobile plural component plant as set forth in claim 1 in which said last-mentioned conveyor means is releasable from one of said semi-trailers to permit said semi-trailers to be separated and separately towed.

5. A mobile plural component plant as set forth in claim 1 in which the support members on the semi-trailers which are adapted to move downwardly to engage a support therebelow when the front end of the first semi-trailer is raised, are comprised of support leg means mounted on said first semi-trailer rearwardly of the pair of wheels on the first semi-trailer so as to move downwardly for engagement with a support therebelow when the front end of said first semi-trailer is raised and thereby relieve weight from the wheels of the first semi-trailer without regard to the presence or absence of the second semi-trailer.

6. A mobile plural component plant as set forth in claim 1 in which the support members of said trailers adapted to engage a support therebelow are comprised of support leg means on said second semi-trailer forwardly of the wheels of said second semi-trailer whereby on raising of the front end of said first semi-trailer and the consequent lowering of the trailer hitch on the first semi-trailer and the front end of said second semi-trailer, said leg means will move downwardly to engage such support and relieve the wheels of said second semi-trailer.

7. A mobile plural component plant as set forth in claim 1 in which said support members on said semi-trailers for moving downwardly to engage a support therebelow are comprised of support leg means on said first semi-trailer rearwardly of the wheels of said first semi-trailer and support leg means on said second semi-trailer forwardly of the wheels of said second semi-trailer whereby upon raising of the front end of said first semi-trailer to plant operating position the rear end of said first semi-trailer and the forward end of said second semi-trailer will be lowered and said leg means will engage a support therebelow, and said leg means being proportioned in length and position so that upon such raising of the front end of the first semi-trailer said leg means will engage said support substantially simultaneously to relieve both sets of wheels of the weight of the trailers thereon.

8. A mobile plural component plant as set forth in claim 1 in which there is an additional storage container for a different material to be batched mounted on said first semi-trailer and a second conveyor means for conveying material from said last-mentioned storage container to the vicinity of said chute carried by said first semi-trailer, and means for batching material from said second storage container into said chute, said last-mentioned batching means being also carried by said first semi-trailer.

9. A mobile plural component plant as set forth in claim 8 in which the first-mentioned storage container is a bin for aggregate used in concrete, the first-mentioned batching apparatus is a weighing apparatus for receiving aggregate from said first-mentioned storage container and weighing the same into batches, and said first-mentioned conveyor means is an endless belt conveyor extending from the aggregate discharge from the weighing apparatus to the chute in said first semi-trailer, and in which said second-mentioned storage container is a cement silo, said second-mentioned conveyor means is a screw conveyor positioned to receive cement from said cement silo and convey it to said second-mentioned batching means, and said second-mentioned batching means is a weigh batcher for weighing batches of cement conveyed thereto by said screw conveyor having a discharge positioned to discharge cement into said chute.

References Cited

UNITED STATES PATENTS

| | | |
|---|---|---|
| 1,526,527 | 2/1925 | Butler. |
| 3,064,832 | 11/1962 | Heltzel _____ 214—17 |
| 3,090,501 | 5/1963 | Auld _____ 214—17 XR |
| 3,112,099 | 11/1963 | Heise. |
| 3,251,484 | 5/1966 | Hagan _____ 214—2 |

GERALD M. FORLENZA, Primary Examiner

FRANK E. WERNER, Assistant Examiner

U.S. Cl. X.R.

214—17